United States Patent
Nath et al.

(10) Patent No.: US 12,493,598 B1
(45) Date of Patent: Dec. 9, 2025

(54) OBJECT LEVEL LOAD BALANCING FOR WORKLOAD DISTRIBUTION ACROSS DATABASE INSTANCES

(71) Applicant: Teradata US, Inc., San Diego, CA (US)

(72) Inventors: Arup Nath, Hyderabad (IN); Rameshnadh Pallicheruvu, Hyderabad (IN)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/739,649

(22) Filed: Jun. 11, 2024

(51) Int. Cl.
| | |
|---|---|
| *G06F 16/22* | (2019.01) |
| *G06F 9/50* | (2006.01) |
| *G06F 16/2453* | (2019.01) |
| *G06F 16/25* | (2019.01) |

(52) U.S. Cl.
CPC ........ *G06F 16/2246* (2019.01); *G06F 9/5088* (2013.01); *G06F 16/24542* (2019.01); *G06F 16/256* (2019.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 11,461,347 B1* | 10/2022 | Das | ................... | G06F 16/2433 |
| 11,893,016 B1* | 2/2024 | Geng | ............... | G06F 16/24542 |
| 11,941,014 B1* | 3/2024 | Das | ..................... | G06F 16/219 |
| 12,373,414 B1* | 7/2025 | Xie | ..................... | G06F 16/2453 |
| 2019/0147085 A1* | 5/2019 | Pal | ..................... | G06F 16/24542 |
| | | | | 707/718 |
| 2019/0147092 A1* | 5/2019 | Pal | ....................... | H04L 67/125 |
| | | | | 707/713 |
| 2019/0258632 A1* | 8/2019 | Pal | ..................... | G06F 16/2455 |
| 2023/0376471 A1* | 11/2023 | Oh | ..................... | G06F 16/2379 |
| 2025/0045331 A1* | 2/2025 | Delamare | ............. | G06F 9/5066 |

* cited by examiner

*Primary Examiner* — Eliyah S. Harper
(74) *Attorney, Agent, or Firm* — Randy L. Campbell, Jr.

(57) ABSTRACT

A system and method for balancing database workload in a cloud database system employing multiple database instances, wherein intermediate results are shared between database instances via object store or cloud storage system accessible by the multiple database instances. During sharing of intermediate results between database instances having different node sizes or processing unit sizes, load balancing is achieved by evaluating the target and source database instance sizes to select an appropriate load balancing strategy. Data and metadata contained within the intermediate results shared between source and target database instances are organized to provide optimal load balancing on the target database instance.

17 Claims, 8 Drawing Sheets

OBJECT LEVEL LOAD BALANCING FOR WORKLOAD DISTRIBUTION ACROSS DATABASE INSTANCES

FIELD OF THE INVENTION

This invention relates generally to database management systems and external object storage systems, and more particularly, to improved methods for sharing intermediate results between two or more database instances and providing load balancing when sharing intermediate results between two or more asymmetric database instances.

BACKGROUND OF THE INVENTION

A cloud native database is a database that is designed and architected to operate on the cloud with the capability to perform all of the functions of a traditional data warehouse, including data processing, collation, integration, cleansing, loading, reporting, and so on. Teradata Corporation VantageCloud Lake is a cloud native database system designed to automatically leverage elastic, fully isolated multi-compute clusters, as well as highly scalable, elastic, durable and cost-optimized object storage, such as Amazon Simple Storage Service (Amazon S3), so that customers can quickly and easily respond and adapt to changing business needs.

Object storage can be an efficient way to share intermediate results (IRs) between two or more database instances (DI). IRs are often made of one or more data objects and related metadata objects, in an established hierarchical index structure. DIs distribute workloads by sharing IRs, to achieve efficient and faster query executions. However, each DI may contain different node sizes, each with varying Processing Unit (PU) sizes.

Load Balancing is critical for smooth and efficient transfer of IRs, especially among asymmetric database instances. Load balancing is typically achieved by dynamically assigning one target PU to process IRs from one or more source PUs. Sharing IRs between two or more asymmetric DIs may often lead to uneven distribution of work, thus impacting the overall query execution time. Described below is an approach to achieve optimal load balancing while sharing IRs between two or more asymmetric DIs.

BRIEF DESCRIPTION OF THE DRAWINGS

Some implementations of the present disclosure are described with respect to the following figures.

DETAILED DESCRIPTION OF THE INVENTION

Figure 1:
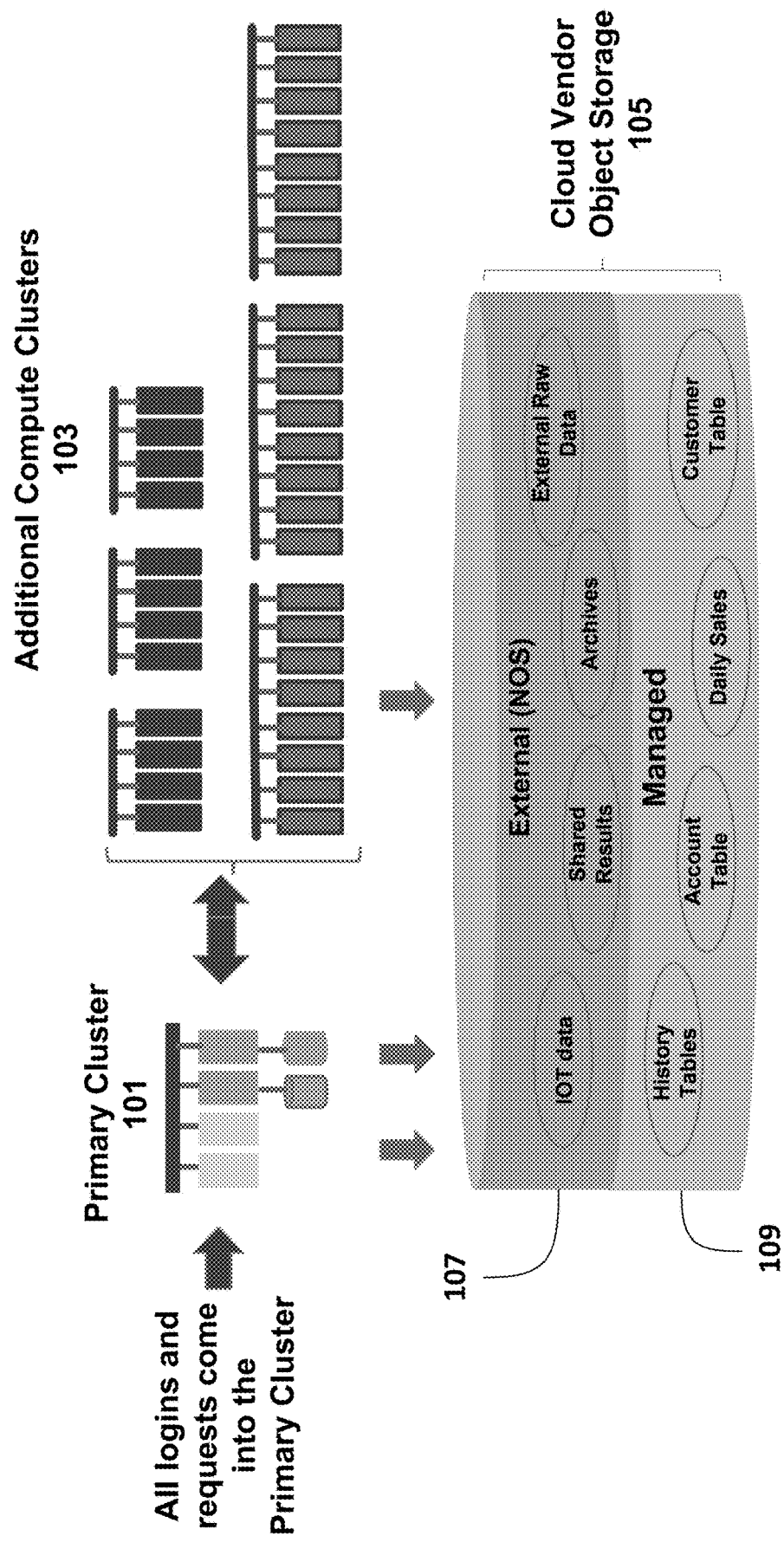
FIG. 1 is a block diagram of an example cloud native database arrangement that includes one or more database management nodes and an object-based remote data store.

FIG. 1 provides a basic block diagram of a VantageCloud Lake database environment. The major components of this system include a primary compute cluster 101, an analytics database forming the hub of the system environment; optional additional compute clusters 103, independent compute resources used to offload compute-intensive query steps from primary cluster 101; and cloud object storage 105 housing data which consists of data in external object storage 107 accessed using native object store (NOS) and owned and managed outside the database; and managed data 109 such as user tables, especially large tables, that are part of the database and can be shared by all compute clusters 103, but stored in cloud storage to reduce storage costs. Within managed object store 109, data is saved using Teradata Corporation object file system (OFS), a file system used to store database objects such as tables, views, macros, triggers, and stored procedures.

A parallel, scalable network connection is provided between primary cluster 101 and multiple compute clusters 103. This connection provides load balancing between multiple compute clusters and transfers finalized query steps to the compute clusters for execution.

Figure 2:
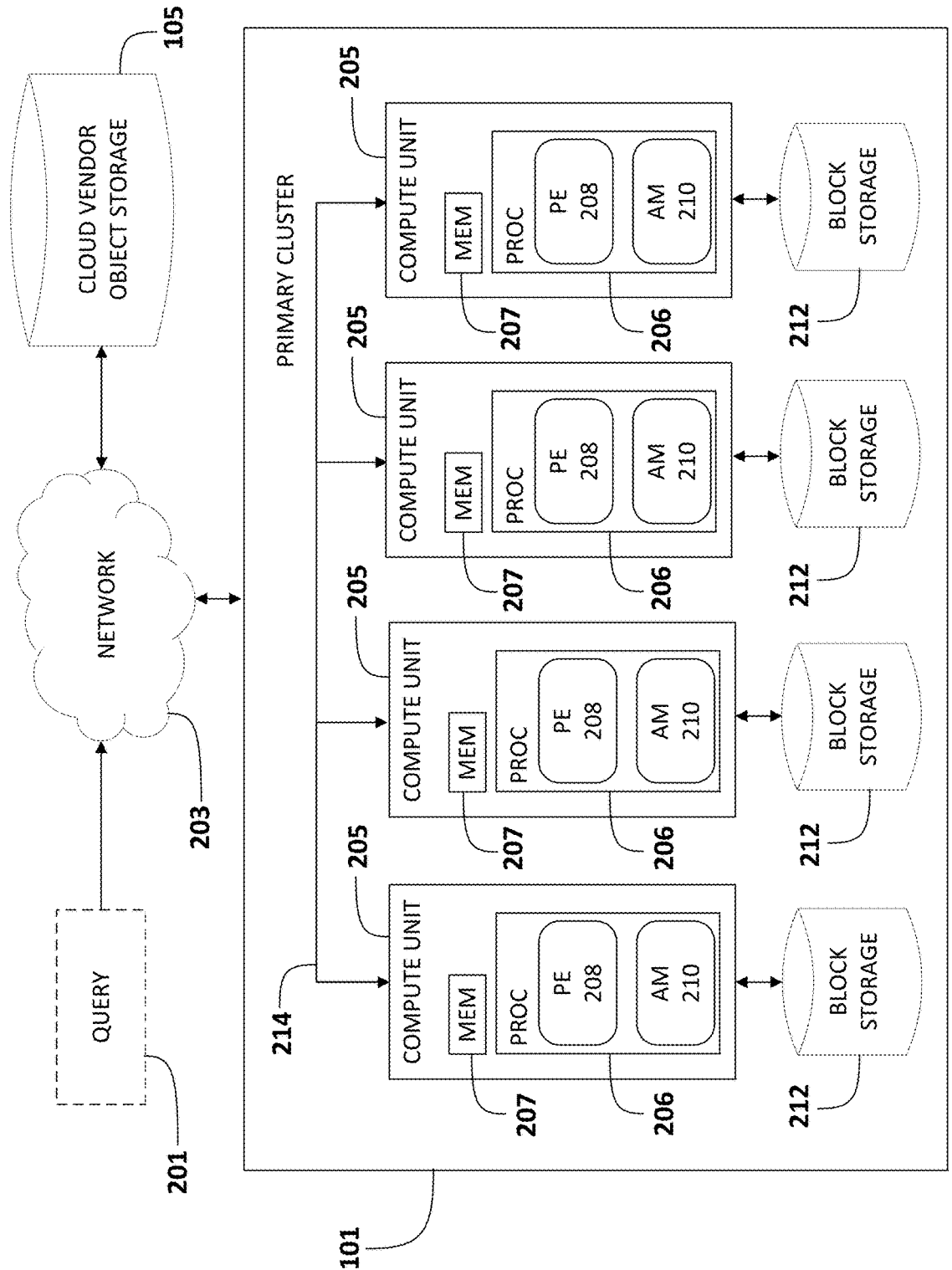
FIG. 2 is a block diagram of a database management node cluster encompassing a database management system.

Primary cluster 101 contains a database management system consisting of one or more network compute units or nodes 205 that manage the storage, retrieval, and manipulation of data stored on one or more block storage disks 212 as shown in FIG. 2. The database management system may be a combination of software (e.g., computer program routines, subroutines, applications, etc.) and hardware (e.g., processors, memory, etc.).

Generally, requests in the form of queries 201 are transmitted via a network 203 to the primary cluster 101, and responses are received therefrom. The database management system of primary cluster 101 performs the workload comprised of the one or more queries 201 against a relational database comprised of one or more tables storing data. Specifically, the database management system performs the functions described below, including accepting the workload comprised of the queries 201, generating one or more query execution plans (QEPs) from the queries 201, and then performing the query execution plans to process data retrieved from the tables. Moreover, the results from these functions may be provided directly to clients, may be provided to other systems (not shown) by network 203, or may be stored by the data management system in the database.

As shown in FIG. 2, primary cluster 101 is connected to cloud-based store 105 via a cloud network interface 203, wherein the cloud-based store 105 stores one or more objects (not shown), such as one or more datasets storing data. The cloud-based store 105 may be a distributed object store such as Amazon Simple Storage Service (Amazon S3), or a distributed file system such as Hadoop Distributed File System (HDFS). The database management system may retrieve the data from the objects in the cloud-based store 105, wherein the data is then stored in the relational database for use by the database management system in processing queries 201.

In one example, each compute unit 205 may include one or more physical processors 206 and memory 207. The memory 207 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 206 such as multiprocessing, multitasking, parallel processing and the like, for example.

The compute units 205 may include one or more other processing units such as parsing engine (PE) modules 208 and access modules (AM) 210. As described herein, "modules" are defined to include software, hardware or some combination thereof executable by one or more physical and/or virtual processors, e.g., Teradata Access Module Processors (AMPs). Software modules may include instructions stored in the one or more memories that are executable by one or more processors. Hardware modules may include various devices, components, circuits, gates, circuit boards, and the like that are executable, directed, and/or controlled for performance by one or more processors.

The parsing engine modules 208 and the access modules 210 may each be virtual processors (vprocs) and/or physical processors. In the case of virtual processors, the parsing engine modules 208 and access modules 210 may be executed by one or more physical processors, such as those that may be included in the compute units 205. For example, in FIG. 2, each parsing engine module 208 and access module 210 is associated with a respective compute unit 205 and may each be executed as one or more virtual processors by physical processors 206 included in the respective compute unit 205.

In FIG. 2, each compute unit 205 may include multiple parsing engine modules 208 and access modules 210, such that there are more parsing engine modules 208 and access modules 210 than compute unit 205.

The database management system stores data in one or more tables in block storage 212. In one example, the database system may be configured to distribute rows across access modules 210 and their associated block storage 212. These rows may include rows read from object store 105. Each parsing engine module 108 may organize the storage of data and the distribution of table rows and columns. The parsing engine modules 208 may also coordinate the retrieval of data from block storage 212 in response to queries received through connection with a network 203. The network 203 may be wired, wireless, or some combination thereof. The network 203 may be a virtual private network, web-based, directly-connected, or some other suitable network configuration.

Figure 3:
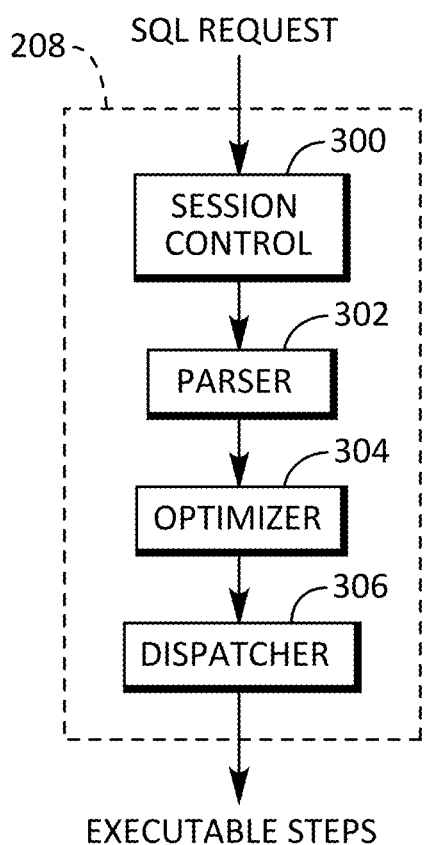
FIG. 3 is a block diagram of a parsing engine module within the example database management node cluster of FIG. 2.

In one example system, each parsing engine module 208 includes four primary components: a session control module 300, a parser module 302, an optimizer 304, and a dispatcher module 306 as shown in FIG. 3. The session control module 300 provides the logon and logoff functions. It accepts a request for authorization to access the database, verifies it, and then either allows or disallows the access. Once the session control module 300 allows a session to begin, an SQL request may be received such as through submission by a user and the SQL request is routed to the parser module 302.

Figure 4:
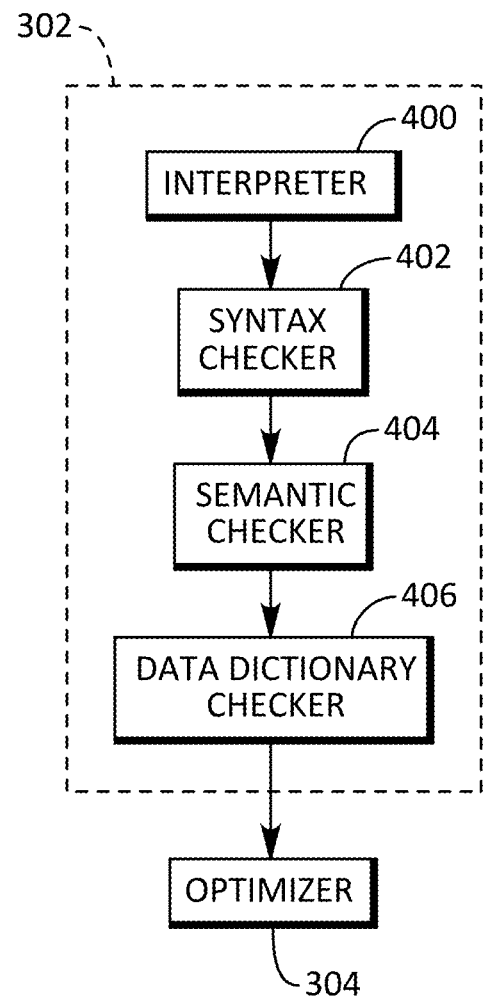
FIG. 4 is a block diagram of a parser module within the example database management node cluster of FIG. 2.

As illustrated in FIG. 4, the parser module 302 may include an interpreter module 400 that interprets the SQL request. The parser module 302 may also include a syntax checker module 402 that checks the request for correct SQL syntax, as well as a semantic checker module 404 that evaluates the request semantically. The parser module 302 may additionally include a data dictionary checker 406 to ensure that all of the objects specified in the SQL request exist and that the user has the authority to perform the request. The parsing engine module 208 implements the optimizer module 304 to select the least expensive plan to perform the request, and the dispatcher 306 coordinates the runtime execution of executable steps of the query execution plan of the optimizer module 304 with the access modules 210.

Selecting the optimal query-execution plan may include, among other things, identifying which primary cluster 101, compute clusters 103, and compute units 205 are involved in executing the query and which database tables are involved in the query, as well as choosing which data-manipulation techniques will serve best in satisfying the conditions of the query. To this end, for each parsing engine module 208, the parser module 302 (see FIG. 3), and/or optimizer module 304 may access a data dictionary module (not shown) specifically for parsing engine module 208.

The data dictionary module may specify the organization, contents, and conventions of one or more databases, such as the names and descriptions of various tables maintained by database management system as well as fields of each database, for example. Further, the data dictionary module 406 may specify the type, length, and/or other various characteristics of the stored tables. The database management system typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system separately or in conjunction with SQL. The data dictionary may be stored in block storage disks 212 or some other storage device and selectively accessed.

Referring again to FIG. 2, an interconnection 214 allows communication to occur within and between each compute unit 205. For example, implementation of the interconnection 214 provides media within and between each compute unit 205 allowing communication among the various processing units. Such communication among the compute units may include communication between parsing engine modules 208 associated with the same or different compute units 205, as well as communication between the parsing engine modules 208 and the access modules 210 associated with the same or compute units 205. Through the interconnection 214, the access modules 210 may also communicate with one another within the same associated compute unit 205 or other compute units 205.

The interconnection 214 may be hardware, software, or some combination thereof. In instances of at least a partial-hardware implementation the interconnection 214, the hardware may exist separately from any hardware (e.g, processors, memory, physical wires, etc.) included in the compute units 205 or may use hardware common to the compute units 205. In instances of at least a partial-software implementation of the interconnection 214, the software may be stored and executed on one or more of the memories 207 and processors 206 of the compute units 106 or may be stored and executed on separate memories and processors that are in communication with the compute units 205. In one example, interconnection 214 may include multi-channel media such that if one channel ceases to properly function, another channel may be used. Additionally, or alternatively, more than one channel may also allow distributed communication to reduce the possibility of an undesired level of communication congestion among compute units 205.

Compute clusters 103 exist as separate clusters of network-connected nodes independent of primary cluster 101. Each compute cluster 103 is separate and may be specialized. Compute clusters 103 enable the extension and scaling of system compute power.

Figure 5:
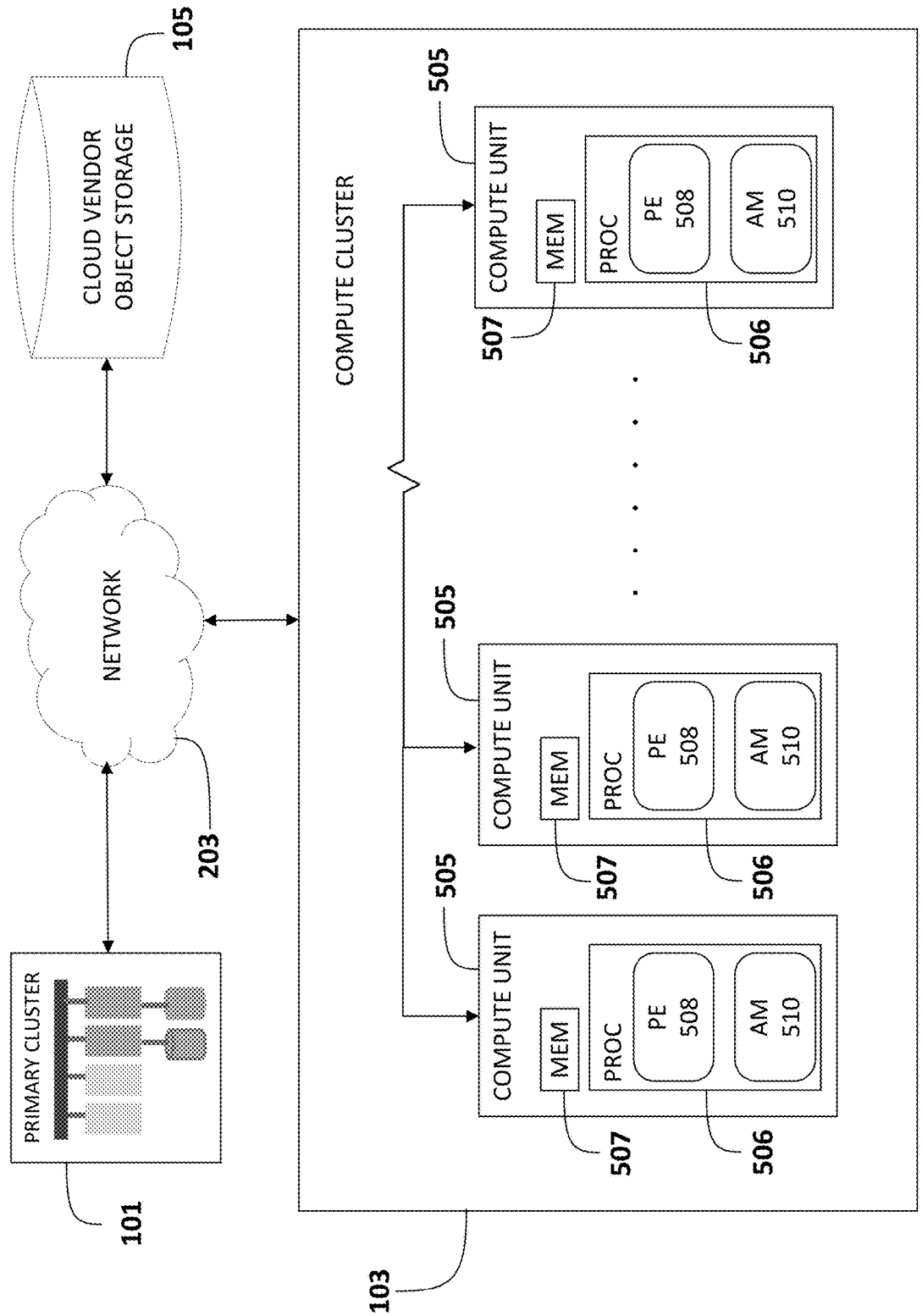
FIG. 5 is a block diagram of a compute node cluster.

As shown in FIG. 5, compute clusters 103 may contain one or more compute units or nodes 505, wherein each node 505 may include one or more physical processors 506 and memories 507. Compute clusters 103 include one or more parsing engine modules 508 and access modules 510, but unlike primary cluster 101, the compute clusters 103 do not have any persistent block storage for user data. Compute clusters 103 depend on the primary cluster parsing module 208 and optimizer 304 to direct the steps that the compute cluster will execute on behalf of a query. No query planning takes place on the compute cluster.

Compute clusters 103 do not have any permanent data. A data dictionary structure exists on a compute cluster, but it serves only the transient needs of the compute cluster. It does not contain table or column descriptions or details about statistics, indexes, or privileges. All that detail is maintained in primary cluster 101.

A compute cluster 103 can read large tables in object storage 105. It can also hold intermediate data, keeping it in memory or in internal drives.

Elasticity and extensible compute power is provided to the database platform via different quantities, configurations, and sizes of compute clusters 103. Each compute cluster 103 stands alone and executes queries that access object storage 105 to perform compute-intensive work such as analytic functions, freeing up primary cluster 101 to perform session management, parsing engine work, and tactical or other short-term work.

Depending on workload, a compute configuration may employ compute clusters having differing quantities of compute nodes 505 and processing capability. A compute cluster having a greater number of compute units or nodes 505 will accordingly have more processors 506, memory 507, access modules 510. With more access modules, a query or task assigned to a larger compute cluster can execute at a higher level of parallelism and deliver faster response times. Compute clusters can be categorized as either Small, Medium, Large, or X-Large depending upon the number of compute units or nodes 505 contained in a compute cluster 103.

A compute configuration may employ zero or many compute clusters, with compute clusters being added or removed to the configuration to meet workload needs. A compute configuration with zero compute clusters would consist of only primary cluster 101. Groupings of compute clusters can automatically scale up additional compute clusters based on resource demand or the number of active queries.

The optimizer 304 in the primary cluster 101 determines which query steps go to a compute cluster 103 and builds a query plan. During optimization, the work that a query needs to accomplish is broken into several steps. Some of these steps will execute on primary cluster 101, and if appropriate privileges are in place, some steps will execute on a compute cluster 103. Even if there are several compute clusters within a cluster configuration, a single query can only execute steps in one compute cluster. An execution plan may include processing a query step or two in primary cluster 101, and then processing one or more steps on a compute cluster 103. The compute cluster parsing engine 508 receives the query plan from primary cluster 101 and is responsible for dispatching steps down to the compute cluster access modules 510 for execution. When to use a compute cluster 103, what compute clusters to use, and the quantity of clusters to use, is determined by the optimizer 304 in primary cluster 101 at the time the initial query plan is built.

Figure 6:
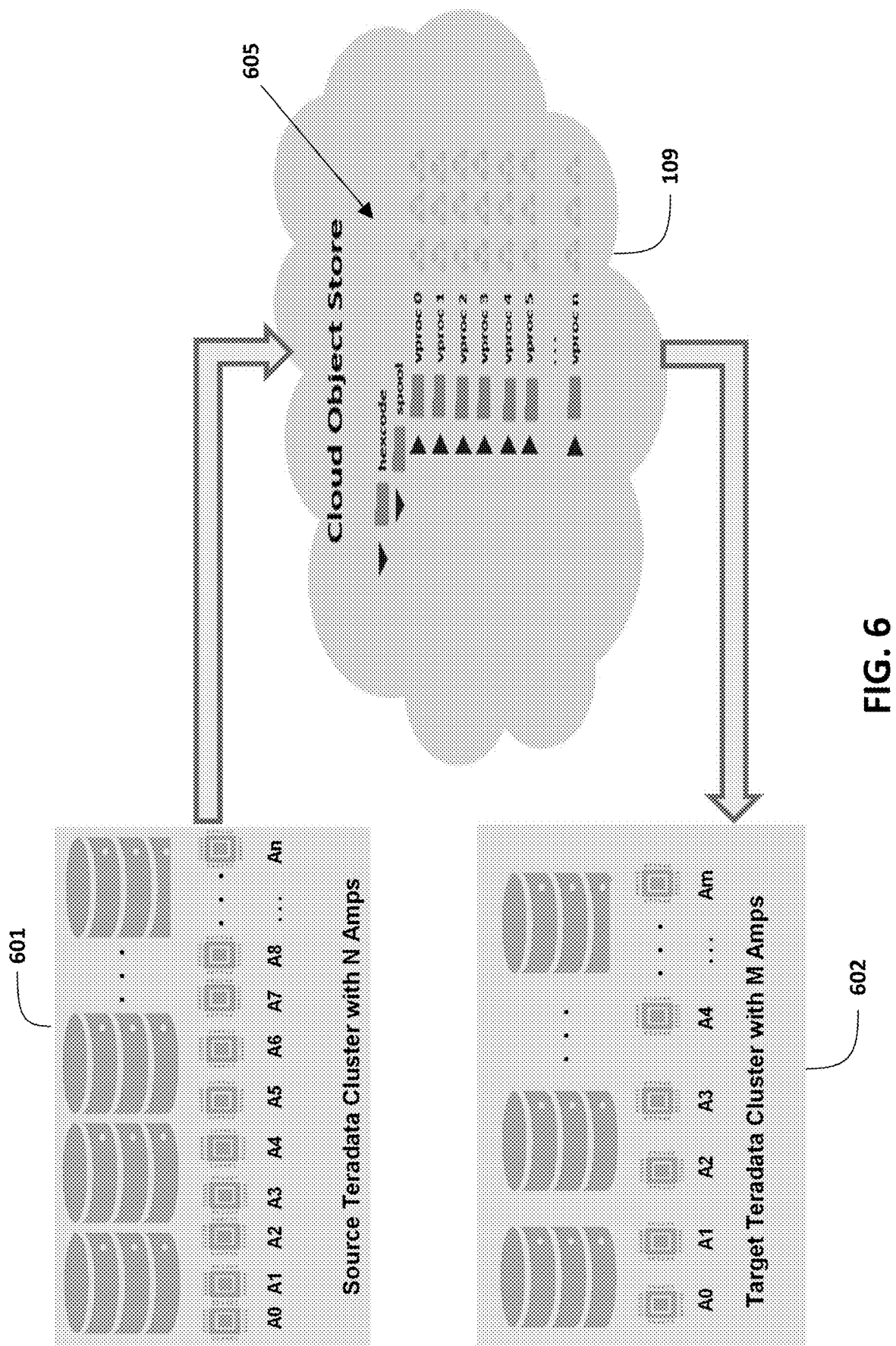
FIG. 6 illustrates the sharing of intermediate results between database instances having different processing capabilities.

Each cluster in the database environment is independent and isolated from other clusters, with each cluster capable of hosting a database instance, though queries can span a primary cluster 101 and one or more compute clusters 103 with communication between primary cluster 101 and compute clusters 103 occurring through a network connection 203. Data and instructions about how to execute query 201 may also be transmitted between the primary and compute clusters means of a data access layer referred to as data fabric, such as QueryGrid provided by Teradata Corporation. Results generated by compute clusters 103 are provided through the network or data fabric back to primary cluster 101. Alternatively, intermediate or final results may be shared among clusters or database instances via cloud object store 109 utilizing object file storage (OFS) spool, a temporary file or structure in which data is temporarily held, as shown in FIG. 6, discussed below.

As stated earlier, object storage can be an efficient way to share intermediate results (IRs) between two or more database instances (DIs). Intermediate results are often comprised of one or more data objects and related metadata objects, in an established hierarchical index structure. A database instance comprises a complete database environment and its components, including relational database management system (RDBMS) software, table structures, stored procedures, and other functionality.

Figure 7:
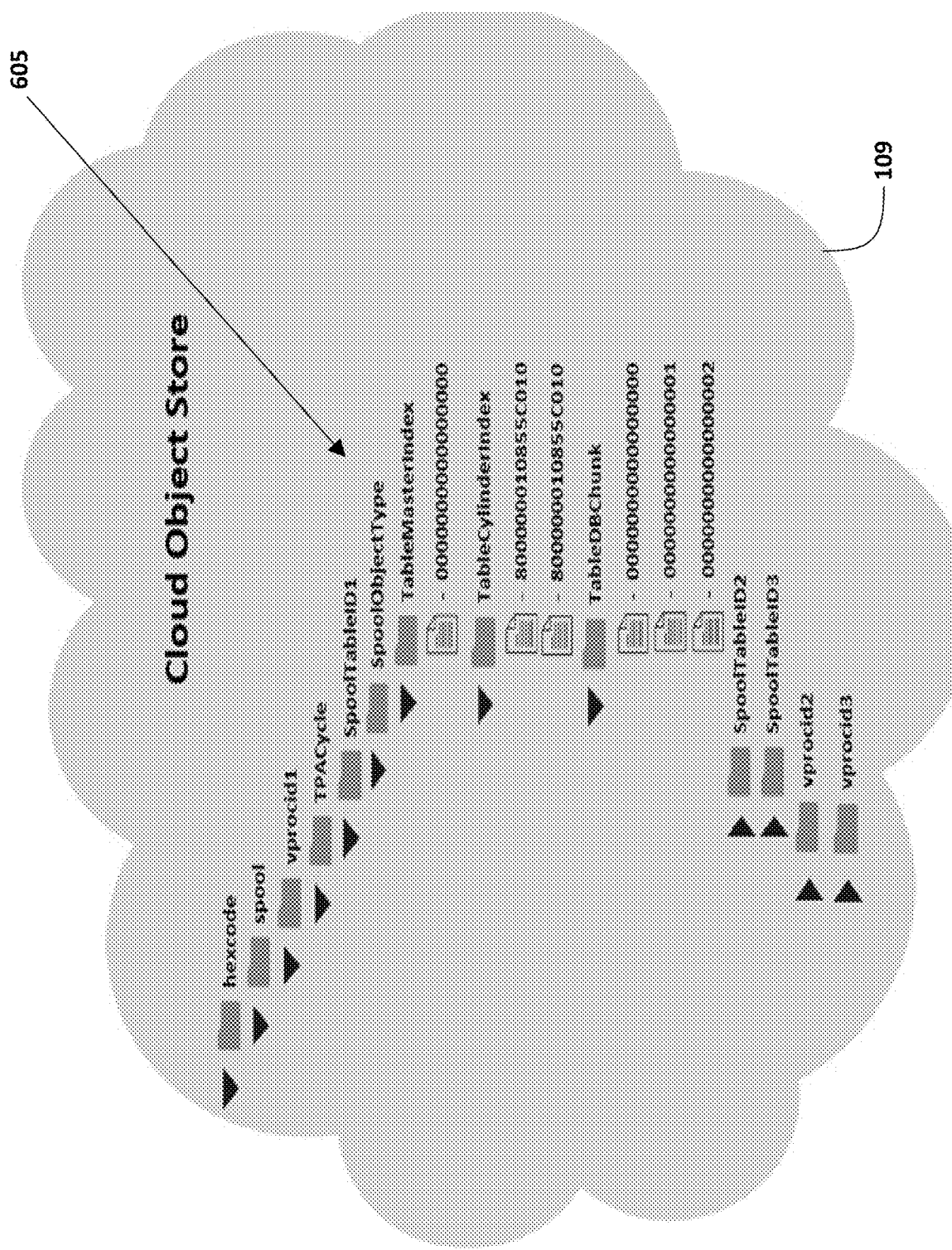
FIG. 7 provides greater detail of the example OFS spool 603 illustrated in FIG. 6.

Database instances distribute workloads by sharing intermediate results, to achieve efficient and faster query executions. Each DI may contain different node sizes, each with varying processing unit (PU) sizes. FIG. 6 shows the sharing of Intermediate Results 605 between source cluster 601 containing N AMPs, labeled A1 through An, and a target cluster 602 having M AMPs, labeled Al through Am. Intermediate results 605, in the form of an object file storage (OFS) spool, is represented by a B-Tree, or Balanced Tree, data structure. A more detailed representation of an example OFS spool structure is illustrated in FIG. 7. Referring to FIG. 7, the example OFS spool structure is seen to include elements for storage of data and metadata for multiple AMPs or vprocs (vprocid1, vprocid2, vprocid3, etc.) spool table ID information (SpoolTableID1, SpoolTableID2, SpoolTableID3, SpoolTableID1,etc.), table index information (TableMasterIndex, TableCylinderIndex), and chunks of table data (TableDBChunk). Data chunks result from splitting larger data sets into more manageable, smaller pieces. These spool elements are useful in the object write and object-level load balancing solutions discussed below and illustrated in FIG. 8 and FIG. 9.

Unfortunately, an OFS Spool when shared between two or more asymmetric DIs may lead to an uneven distribution of query tasks on the target DI, i.e., redistributed data transferred from cluster 601 with N AMPs to cluster 602 having M AMPs through OFS spool 605 may be skewed making some AMPs work on more rows compared to other AMPs. This processing skew can cause uneven CPU and IO utilization, with AMPs having more rows to process experiencing longer task completion times and detrimentally impacting the overall query execution time.

Load balancing is typically performed by dynamically assigning one target PU to process IRs from one or more source PUs. At present, load balancing recognizes PU level data as the smallest unit for load balancing. For queries requiring IR transfers between two asymmetric DIs, the following situations may occur:
  a) The target DI size is smaller than the source DI size: Each target PU may require processing of one or more units of PU data from the source DI.
  b) The target DI size is larger than the source DI size: Some target PUs may be idle, since the source PU units are already distributed amongst the other target PUs.

Either of the cases above could result in sub-optimal load balancing, thus impacting the overall elapsed time for query executions.

An optimal load balancing technique requires collecting information on all the IR objects across all the PUs on the source DI and conveying this information to all the participating PUs on the target cluster. To achieve this result, a significant effort is required to establish synchronization mechanisms on both source and target DIs. Furthermore, the extra IOs and contentions evolving from such synchronization efforts could make the load balancing complicated and often unnecessary in many situations, e.g., while transferring small IRs.

The innovation described herein explores approaches to optimally balance load at object level while sharing IRs between two asymmetric DIs, with minimal synchronization overhead and with the same, if not better, system resource usages during the query execution.

The optimizer 304 while generating a plan with IR transfer, evaluates the target and source DI sizes to select appropriate load balancing strategy. Consider the two following situations:
  a) PUs in source and target DIs have N:1 correspondence, each target PU, processes one or more units of source PU data. This is the best-case scenario, extra effort for object level load balancing is not desirable. A PU level N:1 load balancing could deliver better results, unless there are PU level skewness.
  b) PUs in source and target DIs do not have N:1 correspondence, one or more target PUs process additional units. Object level load balancing may be used to achieve optimal query performance.

There are two design proposals to achieve object level load balancing, each with its own advantages and disadvantages. The first solution addresses the most common case, which requires one-time IR transfer, and the relative order of the dataset is not important. IRs generated by this first approach cannot be updated subsequently. The second solution deals with other complex interactions, where relative order of the dataset is to be maintained and an IR may be used by more than two DIs with varying configurations, and in subsequent transfers.

Solution #1: Target Based Object Writes: Object-level load balancing can be achieved by cross writing objects as per the target DI's configuration. A source PU can assign a produced object to one of the target PUs, in a round robin fashion.

A global semaphore at the source DI, can be used to synchronize the target PU assignments. A semaphore is a variable or data type used to control access to a common resource by multiple threads. The semaphore may be a counting semaphore based on an integer value. This value represents the number of available resources or the maximum number of concurrent processes that can access a particular resource. As processes interact with the semaphore, the integer value can be incremented or decremented to reflect the number of available resources. A counting semaphore ensures that multiple processes can safely access shared resources in a coordinated and efficient manner, preventing deadlocks, ensuring mutual exclusion, and enhancing system performance by minimizing the waiting time of processes.

When this object-level load balancing strategy is chosen, a pre-PU logic, also referred to as a Dispatcher, will allocate and initialize the global semaphore and pass the semaphore info to the source PUs. Each source PU produces an IR object as usual, however, before writing the object to the Object Storage, the object's owner PU on the target DI is determined using the global semaphore. The semaphore is initialized to ZERO before the source PUs start to produce IR objects. Each PU then atomically reads the semaphore value and increments it by one. A simple modulo operation, e.g., dividend=monotonically increasing semaphore value, divisor=target DI's PU count, can be used to determine the owner of an object in the target DI. On the target side each PU is aware of its share of IR objects and can individually start processing them without any further synchronization. For example:

| Source DI: PU0, PU1, PU2 (size = 3), Initial semaphore value = 0), Destination DI: PU0, PU1 (size = 2) | | |
| --- | --- | --- |
| Source Producer PU | Semaphore Value (before -> After) | Target PU#/Seq# |
| PU1 | 0 -> 1 | (0%2) => PU0, (0/2) => Seq0 |
| PU1 | 1 -> 2 | (1%2) => PU1, (1/2) => Seq0 |
| PU0 | 2 -> 3 | (2%2) => PU0, (2/2) => Seq1 |
| PU2 | 3 -> 4 | (3%2) => PU1, (3/2) => Seq1 |
| PU1 | 4 -> 5 | (4%2) => PU0, (4/2) => Seq2 |
| PU0 | 5 -> 6 | (5%2) => PU1, (5/2) => Seq2 |
| ... | ... | ... |

Figure 8:
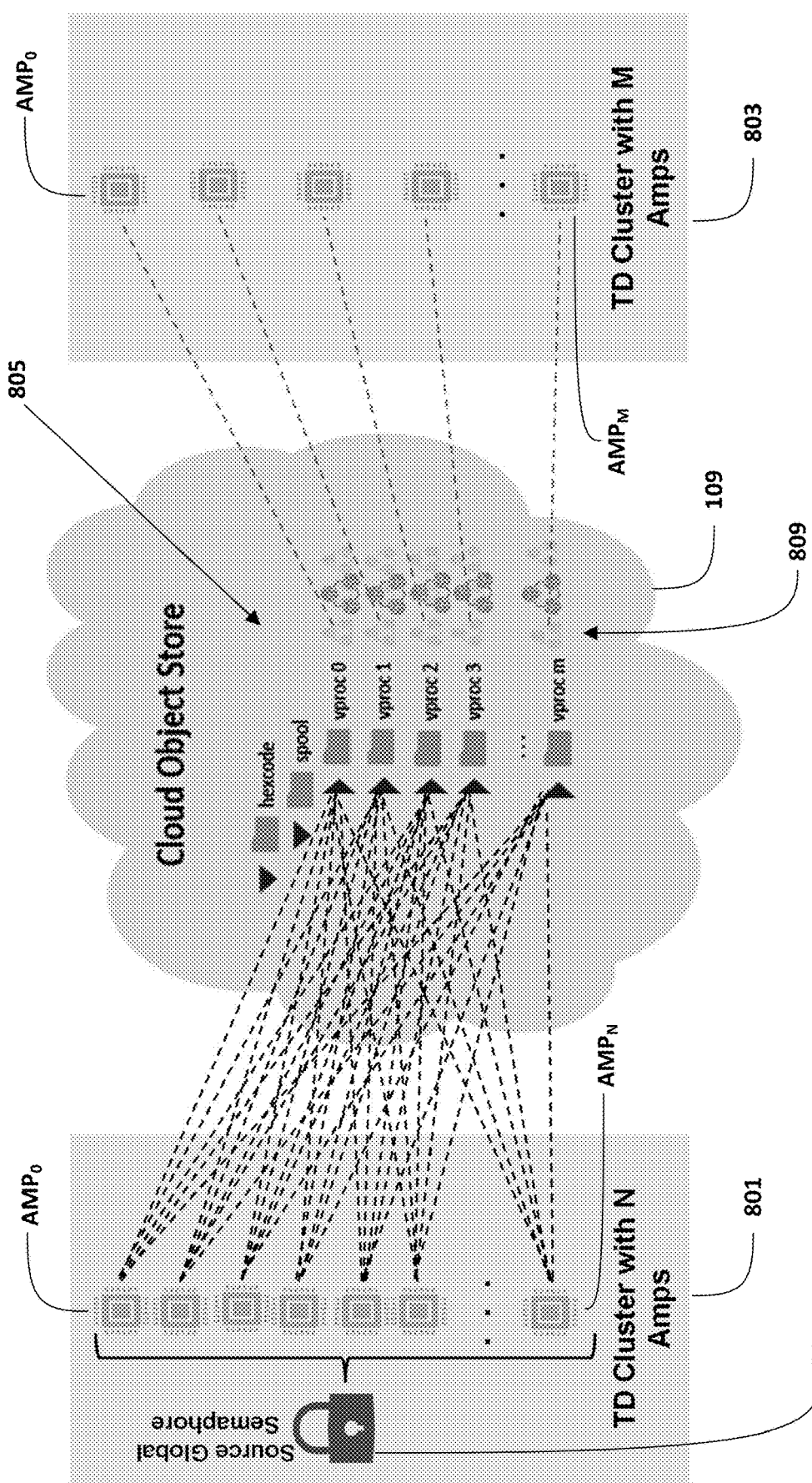
FIG. 8 illustrates an improved process for sharing intermediate results as an OFS spool between asynchronous database instances in accordance with a first embodiment of the invention.

In the context of a parallel database, such as a Teradata Corporation Database System (Teradata DB), the strategy can be visualized as shown in FIG. 8, wherein a transfer of IR 805 from source DI 801 to target DI 803 is illustrated. DI 801 comprises a Primary Teradata DB Cluster with N PUs (AMPs/Vprocs), IR 805 is an OFS spool shared via object store 109, and target DI 803 comprises a Teradata DB compute cluster with M PUs (AMPs/Vprocs).

Chunks of data, referred to as TDBChunks, are written from source DI 801 (Primary Teradata DB Cluster) AMPs to shared OFS spool 805 virtual processor folders/paths, vproc 0 through vproc m, corresponding to the M AMPs in target DI 803 (Teradata DB compute cluster), in a round robin fashion. Global semaphore (GSM) 807 is updated while writing TDBChunks to derive vproc IDs and sequence numbers. Target DI 803 AMPs sequentially read objects 809 from respective vproc paths, without an index or additional logic required on target DI 803.

The cross-PU assignment strategy could disturb the index structures of IRs, if any. As a result any subsequent IR access by another DI with a configuration other than the initial intended target DI's configuration, will not be possible. When used for one-time transfers, queries with a small IR may see better performance due to reduced IOs for index maintenance. The only way for a target DI to access IRs is to read the objects sequentially. A sequential object read logic does not depend upon index structures, thus further reducing the IOs.

Solution #2: Source based Object writes with Load Balancing Metadata: For the cases where IRs are accessed multiple times from different DIs, relative order of the dataset is important, or a desired access path, e.g., primary key, is required, a slight deviation of the load balancing algorithm can be used to optimally balance the load. The optimizer decides not to use cross-PU assignments. The PUs write the IRs along with relevant indexes, as per the source DI's configuration. Each PU maintains information about the IR objects written by them, in a local context. The last done source PU, i.e. the last PU to complete writes, collects all the IR object information from all other PUs and writes collected IR information as a new object into the object store. On the target side, the first active PU reads the newly written object and passes the information to all other PUs. Now the target PUs can individually find out their respective allocations and continue processing the IR objects. The IR objects can be accessed sequentially or as a range with the help of IR index structure. This strategy will enable different DIs to read or update IRs irrespective of their configurations.

For example:
Source DI: (size=3, Total Object Count=9)
  PU0: Seq0, Seq1, Seq2, Seq3
  PU1: Seq0, Seq1
  PU2: Seq0, Seq1, Seq2
Destination DI: PU0, PU1 (size=2)
  PU0: [PU0, Seq0], [PU0, Seq1], [PU0, Seq2], [PU0, Seq3]
  PU1: [PU1, Seq0], [PU1, Seq1], [PU2, Seq0], [PU2, Seq1], [PU2, Seq2]

The objects are partitioned sequentially to better utilize the IR indexes. The reminder objects are dynamically assigned to one or more PUs for better utilization over multiple transfers.

Figure 9:
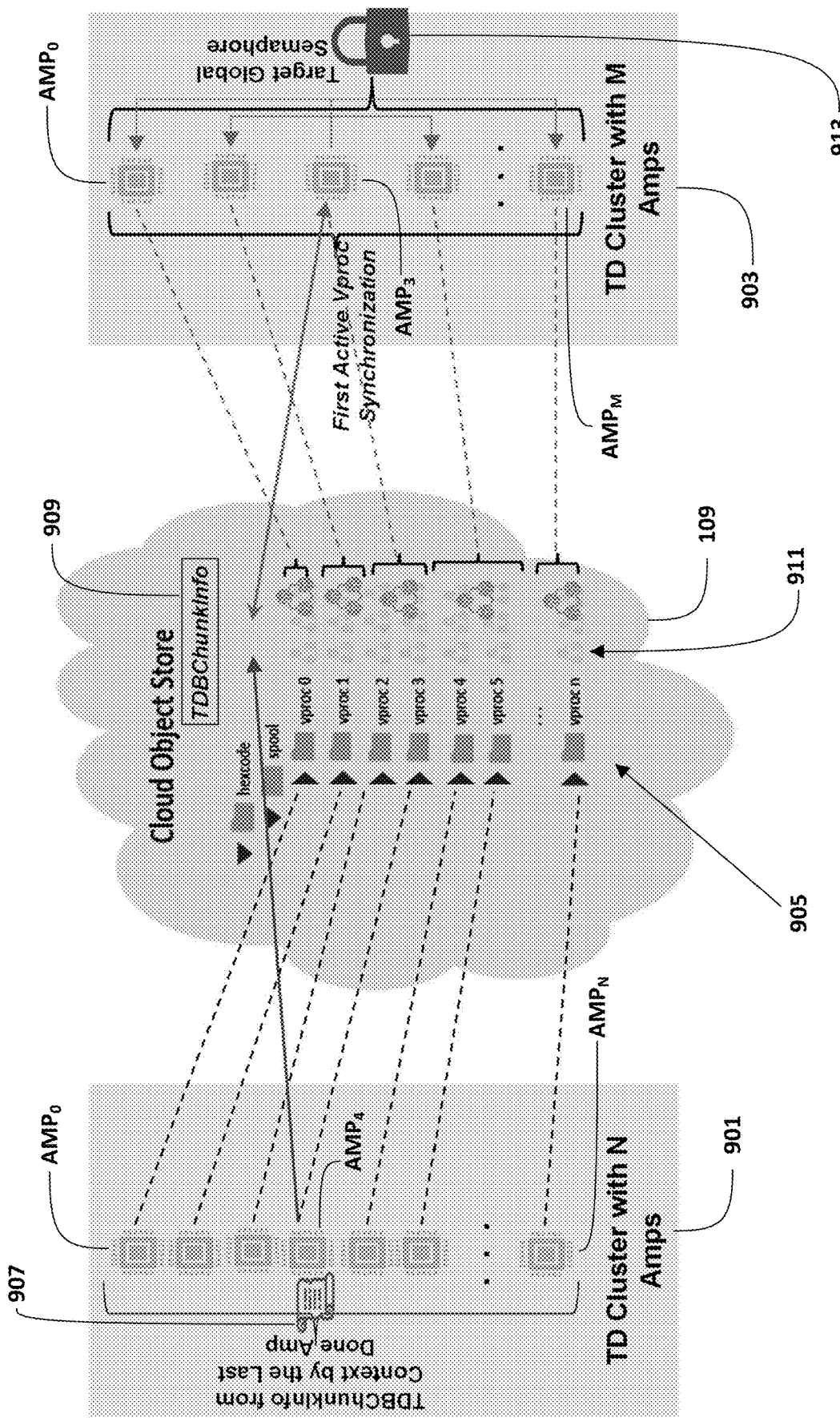
FIG. 9 illustrates an improved process for sharing intermediate results as an OFS spool between asynchronous database instances in accordance with a second embodiment of the invention.

In the context of a parallel database such as Teradata, this strategy can be visualized as shown in FIG. 9, wherein a transfer of IR 905 from source DI 901 to target DI 903 is illustrated. DI 801 comprises a Primary Teradata Cluster with N PUs (AMPs/Vprocs), IR 905 is an OFS spool shared via object store 109, and target DI 903 comprises a Teradata DB compute cluster having M PUs (AMPs/Vprocs).

OFS spool 905 includes folder/paths, labeled vproc 0 through vproc n, corresponding to source DI 901 PUs AMP0 through AMPN, respectively. Chunks of data, TDBChunks, are written from source DI 901 AMPs to the corresponding OFS spool 905 folder/paths using an inter process signaling mechanism that allows processes to communicate with each other and synchronize their actions. Each source DI 901 AMP maintains a counter for written TDBChunks.

The last AMP on source DI 901 to complete writes, e.g., AMP4, collects object information 907 using the inter process signaling mechanism and writes the collected information as a new OFS Spool object, referred to as TDBChunkInfo, 909 in object store 109. TDBChunkInfo 909 contains an aggregation of local context information from all the source DI 901 AMPs, including total and AMP level TDBChunk counts. Alternatively, TDBChunkInfo 909 may be determined from Table Master Indexes (TMIs) or Table Cylinder Indexes (TCIs) or per Amp TDBChunk folders.

On target DI 903 the very first active AMP, e.g. AMP3, reads TDBChunkInfo 909 and cascades the information to all other target DI 903 AMPs. Each target DI 903 AMP can then independently locate and process its share of OFS spool objects 911. Object 911 allocation can be static or dynamic to compensate for the varying object processing time. A global semaphore 913 can facilitate dynamic TDBChunk allocations for target DI 903 AMP object reads.

CONCLUSION

Novelty of this invention is the minimum synchronization overhead required to achieve Object Level Load Balancing for IRs. The solution improves the overall throughput of the system by optimally balancing the load among the participating PUs. The synchronization requirements are bare minimum and risks can be isolated to only the newly implemented logics.

What is claimed is:

1. A database system comprising:
   a computer system comprising at least first and second compute clusters, each one of said compute clusters executing a database management system (DBMS), the computer system receiving a query and assigning query tasks to said compute clusters for execution;
   an object store accessible to said compute clusters for the storage of data objects;
   said first compute cluster including a first quantity of processing components for processing said query tasks assigned to said first compute cluster to generate intermediate results and saving said intermediate results to said object store;
   said intermediate results containing data chunks and metadata organized to provide load balancing on a second quantity of compute components within said second compute cluster, said second quantity different from said first quantity, and wherein said data chunks and metadata are configured based on said second quantity being different from said first quantity; and
   said compute components within said second compute cluster read said intermediate results from said object storage and processes said intermediate results and query tasks assigned to said second compute cluster to generate additional results.

2. The database system in accordance with claim 1, wherein said intermediate results contains data chunks and metadata organized to provide load balancing on said compute components within said second compute cluster comprises a spool.

3. The database system in accordance with claim 2, wherein said spool comprises a B-tree.

4. The database system in accordance with claim 3, wherein:
   said B-tree includes data folders corresponding to each processing component contained in said second compute cluster;
   said data chunks and metadata are written from said compute components contained in said first compute cluster to said data folders within said B-tree in a round-robin fashion; and
   said data chunks and metadata are read by said compute components within said second compute clusters from the corresponding data folders within said B-tree.

5. The database system in accordance with claim 3, wherein:
   said B-tree includes data folders corresponding to each processing component contained in said first compute cluster;
   said data chunks and metadata are written by said compute components within said first compute cluster to the corresponding data folders within said B-tree;
   said first compute cluster generates a file containing context and allocation information for the data chunks and metadata written by said processing components in said first compute cluster to said B-tree, and provides said file to said second compute cluster; and
   said data chunks and metadata are read by said compute components within said second compute clusters from said B-tree in accordance with the context and allocation information contained in said file.

6. The database system in accordance with claim 1, wherein said compute components comprise one of the following:
  physical computer processors,
  virtual computer proccessors, and
  Teradata Corporation Access Module Proccessors (AMPs).

7. The database system in accordance with claim 1, wherein said object store comprises a cloud-based object storage system.

8. A method for executing a query in a database system comprising at least first and second compute clusters, each one of said compute clusters executing a database management system (DBMS), said first compute cluster including a first quantity of processing components and said second compute cluster including a second quantity of processing components, wherein said first quantity is different from said second quantity, the method comprising:
  receiving by said computer system, a query and assigning query tasks to said compute clusters for execution;
  processing by said first quantity of compute components, the query tasks assigned to said first compute cluster to generate intermediate results, and saving said intermediate results to an object store accessible to said compute clusters;
  said intermediate results containing data chunks and metadata organized to provide load balancing on said second compute cluster, and wherein said data chunks and metadata are configured based on said first quantity being different from said second quantity; and
  reading, by said second quantity of compute components within said second compute cluster, said intermediate results from said object storage and processing, by said second quantity of compute components within said second compute cluster, said intermediate results and query tasks assigned to said second compute cluster to generate additional results.

9. The method in accordance with claim 8, wherein said intermediate results contains data chunks and metadata organized to provide load balancing on said compute components within said second compute cluster comprises a spool.

10. The method in accordance with claim 9, wherein said spool comprises a B-tree.

11. The method in accordance with claim 10, wherein:
  said B-tree includes data folders corresponding to each processing component contained in said second compute cluster;
  said data chunks and metadata are written from said compute components contained in said first compute cluster to said data folders within said B-tree in a round-robin fashion; and
  said data chunks and metadata are read by said compute components within said second compute clusters from the corresponding data folders within said B-tree.

12. The method in accordance with claim 10, wherein:
  said B-tree includes data folders corresponding to each processing component contained in said first compute cluster;
  said data chunks and metadata are written by said compute components within said first compute cluster to the corresponding data folders within said B-tree;
  said first compute cluster generates a file containing context and allocation information for the data chunks and metadata written by said processing components in said first compute cluster to said B-tree, and provides said file to said second compute cluster; and
  said data chunks and metadata are read by said compute components within said second compute clusters from said B-tree in accordance with the context and allocation information contained in said file.

13. The method in accordance with claim 8, wherein said compute components comprise one of the following:
  physical computer processors,
  virtual computer proccessors, and
  Teradata Corporation Access Module Proccessors (AMPs).

14. The method in accordance with claim 8, wherein said object store comprises a cloud-based object storage system.

15. A database system comprising:
  a computer system comprising at least first and second compute clusters, each one of said compute clusters executing a database management system (DBMS), the computer system receiving a query and assigning query tasks to said compute clusters for execution;
  an object store accessible to said compute clusters for the storage of data objects;
  said first compute cluster including a first quantity of processing components for processing said query tasks assigned to said first compute cluster to generate intermediate results and saving said intermediate results to said object store to be read and processed by a second quantity of compute components within said second compute cluster, said second quantity different from said first quantity;
  said intermediate results containing data chunks and metadata organized into structures corresponding to said second quantity of processing components within said second compute cluster, and wherein said data chunks and metadata are configured based on said second quantity being different from said first quantity; and
  said compute components within said second compute cluster read data chunks and metadata contained within said corresponding structures within said intermediate results and processes said intermediate results and query tasks assigned to said second compute cluster to generate additional results.

16. The database system in accordance with claim 15, wherein said data chunks and metadata are written from said compute components contained in said first compute cluster to said structures corresponding to said second quantity of processing components within said second compute cluster in a round-robin fashion.

17. A database system comprising:
  a computer system comprising at least first and second compute clusters, each one of said compute clusters executing a database management system (DBMS), the computer system receiving a query and assigning query tasks to said compute clusters for execution;
  an object store accessible to said compute clusters for the storage of data objects;
  said first compute cluster including a first quantity of processing components for processing said query tasks assigned to said first compute cluster to generate intermediate results and saving said intermediate results to said object store to be read and processed by a second quantity of compute components within said second compute cluster, said second quantity different from said first quantity;
  said intermediate results containing data chunks and metadata organized into structures corresponding to said first quantity of processing components within said first compute cluster, and wherein said data chunks and metadata are configured based on said second quantity being different from said first quantity;

said first compute cluster generates a file containing context and allocation information for the data chunks and metadata written by said processing components in said first compute cluster to said corresponding structures within said intermediate results, and provides said file to said second compute cluster; and said data chunks and metadata are read by said compute components within said second compute clusters from said corresponding structures within said intermediate results in accordance with the context and allocation information contained in said file.

* * * * *